US010348409B2

(12) United States Patent
Mathew

(10) Patent No.: US 10,348,409 B2
(45) Date of Patent: Jul. 9, 2019

(54) METHOD AND SYSTEM FOR CONTINUOUS GAIN CONTROL IN A FEEDBACK TRANSIMPEDANCE AMPLIFIER

(71) Applicant: Maxlinear, Inc, Carlsbad, CA (US)

(72) Inventor: Joseph Palackal Mathew, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 46 days.

(21) Appl. No.: 15/816,096

(22) Filed: Nov. 17, 2017

(65) Prior Publication Data

US 2018/0278333 A1 Sep. 27, 2018

(30) Foreign Application Priority Data

Mar. 22, 2017 (IN) .............................. 201711010104

(51) Int. Cl.
*H03G 3/30* (2006.01)
*H04B 10/40* (2013.01)
*H04B 10/564* (2013.01)
*H04B 10/69* (2013.01)

(52) U.S. Cl.
CPC ........... *H04B 10/40* (2013.01); *H04B 10/564* (2013.01); *H04B 10/693* (2013.01)

(58) Field of Classification Search
CPC .................................................. H03G 3/3047
See application file for complete search history.

(56) References Cited

U.S. PATENT DOCUMENTS

| 6,657,417 | B1* | 12/2003 | Hwang | ..................... G05F 1/70 323/207 |
|---|---|---|---|---|
| 7,012,342 | B1* | 3/2006 | Stamps | ..................... H02J 1/08 204/602 |
| 8,344,806 | B1* | 1/2013 | Franck | ..................... H03F 3/195 330/285 |
| 2004/0196105 | A1* | 10/2004 | Filip | ......................... H03F 3/08 330/308 |
| 2006/0012435 | A1* | 1/2006 | Takahashi | ............ H03G 3/3047 330/285 |
| 2012/0068614 | A1* | 3/2012 | Ng | ..................... H05B 33/0851 315/185 R |
| 2017/0067848 | A1* | 3/2017 | Chandrasekhar | .. G01N 27/4163 |

* cited by examiner

*Primary Examiner* — Patricia T Nguyen
(74) *Attorney, Agent, or Firm* — McAndrews, Held & Malloy

(57) ABSTRACT

Methods and systems for continuous gain control in a feedback transimpedance amplifier (TIA) may include: in a TIA including a gain stage, a feedback resistance for the gain stage, a current sense resistor, and a feedback current control circuit: receiving an input current at an input of the gain stage: directing a current through the current sense resistor to the feedback current control circuit, and generating an output voltage proportional to the input current and a gain of the TIA. The gain may be configured by providing a proportion ($\alpha$) of the current through the feedback current control circuit to the input of the gain stage. The proportion $\alpha$ of the current from the feedback current control circuit to the input of the gain stage may be configured by applying a differential voltage to control terminals of a transistor pair in the feedback current control circuit.

20 Claims, 5 Drawing Sheets

METHOD AND SYSTEM FOR CONTINUOUS GAIN CONTROL IN A FEEDBACK TRANSIMPEDANCE AMPLIFIER

PRIORITY CLAIM/INCORPORATION BY REFERENCE

This application claims priority to Indian Patent Application 201711010104 filed on Mar. 22, 2017, which is hereby incorporated by reference in its entirety.

FIELD

Certain embodiments of the disclosure relate to signal processing. More specifically, certain embodiments of the disclosure relate to a method and a system for continuous gain control in a feedback transimpedance amplifier.

BACKGROUND

Communication via wireless and/or wired connections may comprise reception and/or transmission of radio frequency (RF) signals. In this regard, communication devices may transmit and/or receive RF signals carrying exchanged data, with the RF signals being configured in accordance with corresponding wired and/or wireless protocols or standards. Accordingly, signal processing (e.g., of RF signals) must be performed during wireless and/or wired communications to enable proper exchange of information. Exemplary signal processing operations may comprise filtering, amplification, up-convert/down-convert baseband signals, analog-to-digital and/or digital-to-analog conversion, encoding/decoding, encryption/decryption, and/or modulation/demodulation.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method is provided for continuous gain control in a feedback transimpedance amplifier, substantially as shown in and/or described in connection with at least one of the figures, as set forth more completely in the claims.

These and various other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". For example, "x and/or y" means any element of the three-element set $\{(x), (y), (x, y)\}$. Similarly, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration.

Figure 1:
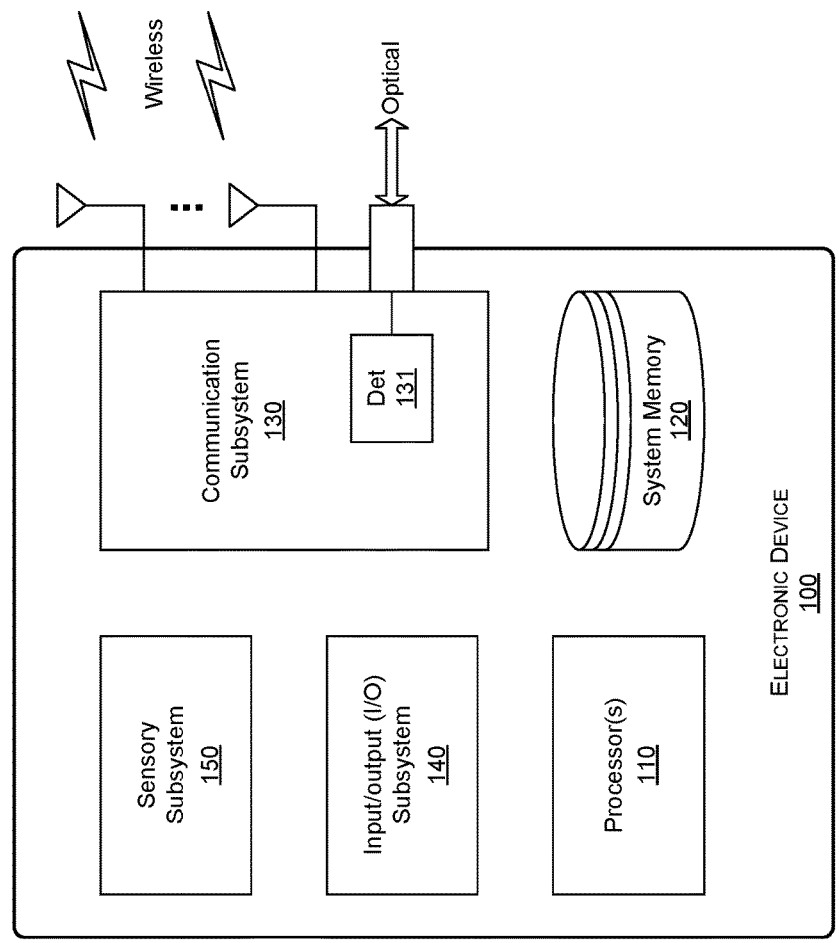
FIG. 1 illustrates an example electronic device that utilizes continuous gain control in a feedback transimpedance amplifier, which may be used in accordance with various implementations of the disclosure.

FIG. 1 illustrates an example electronic device that utilizes continuous gain control in a feedback transimpedance amplifier, which may be used in accordance with various implementations of the disclosure. Referring to FIG. 1, there is shown an electronic device 100.

The electronic device 100 may comprise suitable circuitry, interfaces, logic, and/or code for implementing various aspects of the disclosures. In this regard, the electronic device 100 the electronic device may be configured to support performing, executing or running various operations, functions, applications and/or services. For example, the electronic device 100 may be operable to support, in some instances, such operations as communication operations, processing or handling of data, input/output operations, or the like. In this regard, the electronic device 100 may enable and/or support communication of data, such as via wired and/or wireless connections, which may be configured in accordance with one or more supported wireless and/or wired protocols or standards. To support input/output operations, the electronic device 100 may comprise components or subsystems for enabling interactions with a user (e.g., end-user or installer), so as to obtain user input and/or to provide user output. In some instances, the electronic device 100 may be a handheld mobile device—i.e., be intended for use on the move and/or at different locations. In this regard, the electronic device 100 may be designed and/or configured to allow for ease of movement, such as to allow it to be readily moved while being held by the user as the user moves, and the electronic device 100 may be configured to perform at least some of the operations, functions, applications and/or services supported by the device on the move. Examples of electronic devices may comprise set-top boxes, televisions, displays, gateways, modems, access points, femtocells, computers, cellular phones, smartphones, tablets, and or any other network node. The disclosure, however, is not limited to any particular type of electronic device.

The electronic device 100 may comprise, for example, one or more processors 110, a system memory 120, a communication subsystem 130, an input/output (I/O) subsystem 140, and a sensory subsystem 150.

The processor 110 may comprise suitable circuitry, interfaces, logic, and/or code that may be operable to perform general and/or specialized processing operations in the electronic device 110. For example, the processor 110 may comprise a general purpose processor (e.g., a central processing unit or CPU), a special purpose processor (e.g., graphics processing unit or GPU, or a visual processing unit or VPU), or the like. The disclosure, however, is not limited to any particular type of processor. When utilized as a general purpose processor, the processor 110 may be operable to, for example, process or handle data, control or manage operations of the electronic device 100, and/or handle or support tasks and/or applications performed therein. In this regard, the processor 110 may be utilized to configure and/or control operations of various components and/or subsystems of the electronic device 100, by utilizing, for example, one or more control signals. In some instances, however, the processor 110 may comprise a specialized processor, such as a video/graphics processor or a dedicated application processor that may be utilized for running and/or executing applications (or programs) in the electronic device 100.

The system memory 120 may comprise suitable circuitry, interfaces, logic, and/or code that may enable permanent and/or non-permanent storage, buffering, and/or fetching of data, code and/or other information, which may be used, consumed and/or processed. In this regard, the system memory 120 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage device. The system memory 120 may store, for example, configuration data, which may comprise parameters and/or code, comprising software and/or firmware. The disclosure is not limited, however, to any particular type of configuration data.

The communication subsystem 130 may comprise suitable circuitry, interfaces, logic, and/or code operable to communicate data from and/or to the electronic device, such as via one or more wired and/or wireless connections. The communication subsystem 130 may be configured to support one or more wired protocols and/or interfaces, and/or one or more wireless protocols and/or interfaces, facilitating transmission and/or reception of signals to and/or from the electronic device 100 and/or processing of transmitted or received signals in accordance with applicable wired or wireless protocols. Examples of wireless protocols or standards that may be supported and/or used by the communication subsystem 130 may comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 1G/2G+(e.g., GSM/GPRS/EDGE, and IS-95 or cdmaOne) and/or 1G/2G+ (e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the communication subsystem 130 comprise Ethernet (IEEE 802.2), Fiber Distributed Data Interface (FDDI), Integrated Services Digital Network (ISDN), cable (DOCSIS) and Universal Serial Bus (USB) based interfaces. Examples of signal processing operations that may be performed by the communication subsystem 130 comprise, for example, filtering, amplification, analog-to-digital conversion and/or digital-to-analog conversion, up-conversion/down-conversion of baseband signals, encoding/decoding, encryption/decryption, and/or modulation/demodulation.

The communication subsystem 130 may comprise a detector 131 for receiving optical signals communicated via an optical interface. The detector 131 may comprise a photodetector, such as a photodiode or photoconductor, for example, that generates an electrical signal in response to one or more received optical signals. The communication subsystem 130 may further comprise one or more transimpedance amplifiers for generating an output voltage proportional to the electrical current received from the detector 131. Examples of transimpedance amplifiers may be described further with respect to FIGS. 2-5. The electrical signals may then be digitized by an analog to digital converter (ADC) to enable digital processing.

The I/O subsystem 140 may comprise suitable circuitry, interfaces, logic, and/or code for enabling and/or managing user (e.g., end-user or installer) interactions with the electronic device 100, such as obtaining input from, and/or to providing output to, the device user(s). The I/O subsystem 140 may support various types of inputs and/or outputs, including, for example, video, audio, and/or text. In this regard, dedicated I/O devices and/or components, external to (and coupled with) or integrated within the electronic device 100, may be utilized for inputting and/or outputting data during operations of the I/O subsystem 140. Examples of such dedicated I/O devices may comprise displays, audio I/O components (e.g., speakers and/or microphones), mice, keyboards, touch screens (or touchpads), and the like. In some instances, user input obtained via the I/O subsystem 140, may be used to configure and/or modify various functions of particular components or subsystems of the electronic device 100.

The sensory subsystem 150 may comprise suitable circuitry, interfaces, logic, and/or code for obtaining and/or generating sensory information, which may relate to the electronic device 100, its user(s), and/or its environment. For example, the sensory subsystem 150 may comprise ambient conditions (e.g., temperature, humidity, or light) sensors, positional or location sensors (e.g., GPS or other GNSS based sensors), and/or motion related sensors (e.g., accelerometer, gyroscope, pedometers, and/or altimeters).

In operation, the electronic device 100 may be utilized (e.g., by a user) to perform, execute and/or run various operations, functions, applications or services, such as using pre-configured instructions and/or based on real-time user instructions or interactions. In this regard, various types of operations, functions, applications or services may be available in or supported by the electronic device 100. For example, the electronic device 100 may be used for executing programs, playing video and/or audio content, gaming, email applications (and/or similar type of web based communications), calling services (e.g., voice calls), networking services (e.g., WiFi hotspot, Bluetooth piconet, and/or active 3G/femtocell data channels), or the like. The disclosure, however, is not limited to any particular type of operations, functions, applications or services.

In some instances, operations performed by the electronic device 100 may sometimes require generation of signals with particular characteristics, such as frequencies or amplitudes. For example, the electronic device 100 may be utilized in communication of data, such as using available wireless or wired connections. In this regard, data may be communicated using radio frequency (RF) signals, which may be communicated to and/or from the electronic device 100 over supported wired or wireless interfaces. Processing signals in the electronic device 100 may be performed using suitable components or circuits (e.g., in the communication subsystem 130), in which signals may be generated for use as baseband signals or carrier signals for example. The electronic device 100 may also be utilized in generating audio signals (e.g., for output via speakers), such as based on digital audio content obtained from local sources (storage media), remote sources (e.g., broadcast nodes), or user input (e.g., clicks corresponding to interactions with touchscreen).

In addition, received signals and signals for transmission may require amplification for suitable signal-to-noise ratio. Transimpedance amplifiers (TIAs) may be utilized to receive an input current and output a voltage. A feedback TIA is a commonly employed circuit configuration to convert current mode signals to voltage mode signals where a feedback resistance may be utilized to configure the gain. Accordingly, in various implementations of the disclosure, an enhanced architecture may be utilized for continuous gain control in a feedback transimpedance amplifier, as is illustrated further in FIGS. 2-5.

Figure 2:
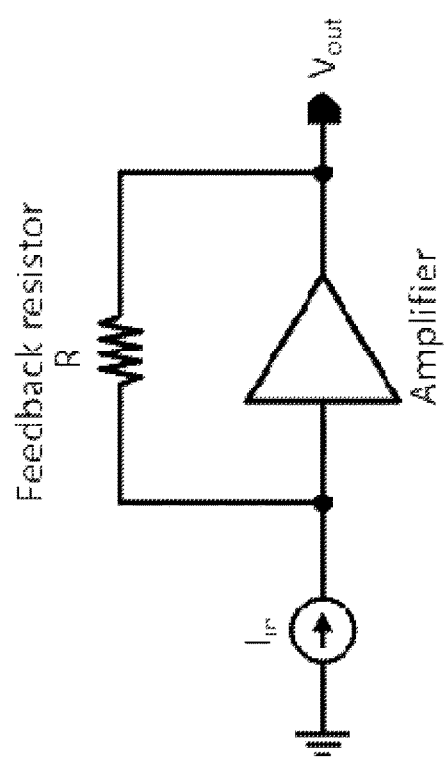
FIG. 2 illustrates an example transimpedance amplifier, which may be used in accordance with various implementations of the disclosure.

FIG. 2 illustrates an example transimpedance amplifier, which may be used in accordance with various implementations of the disclosure. Referring to FIG. 2, there is shown a TIA circuit 200 with an input current $I_{in}$, an amplifier, a feedback resistor $R_F$, and an output voltage $V_{out}$. For the TIA circuit 200, the current to voltage gain ($V_{out}/I_{in}$=G) is configured by value of the feedback resistor ($R_F$). The input current $I_{in}$, may be received from a photodetector, for example.

To make the gain (G) variable, $R_F$ may be implemented as a variable resistor, which may be realized using switches selecting from among a bank of on-chip resistors, for example, to achieve discrete gain steps. In order to implement continuous gain control, active devices such as metal-oxide semiconductor field effect transistors (MOSFETs) or bipolar junction transistors (BJTs) may be utilized to implement a variable resistor. As these devices are non-linear, they affect overall linearity of the TIA circuit 200 and thus the accuracy of the system. Utilizing either discrete or continuously variable feedback resistors, changing the value of the feedback resistance RF, affects the small signal transfer function as well as the stability of the TIA 200.

Figure 3:
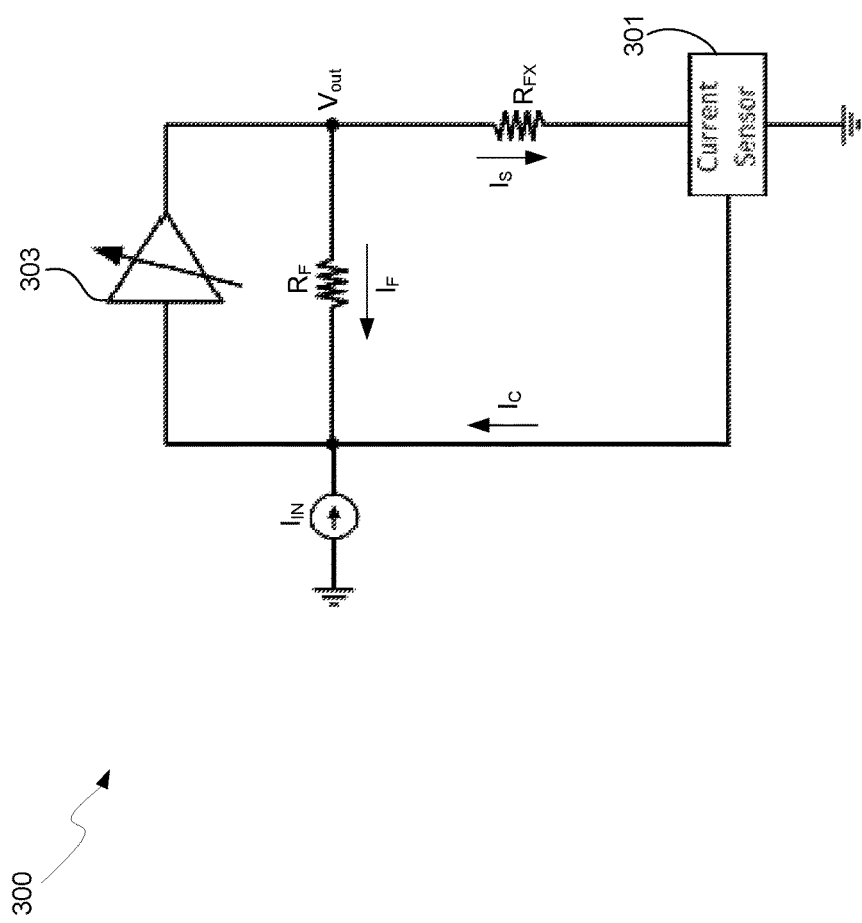
FIG. 3 illustrates a transimpedance amplifier with continuous gain control, which may be used in accordance with various implementations of the disclosure.

FIG. 3 illustrates a transimpedance amplifier with continuous gain control, which may be used in accordance with various implementations of the disclosure. Referring to FIG. 3, there is shown TIA 300 comprising an amplifier 303, feedback resistance RF, current sense resistor $R_{FX}$, a current sensor 301, an input current $I_{in}$, and an output voltage $V_{out}$.

The input current $I_{in}$ is represented as a current source in FIG. 3, and may comprise a photodetector output current, for example, where a voltage representing the sensed optical signal is desired.

The resistors $R_F$ and $R_{FX}$ may comprise fixed resistors, for example, where the parallel combination of the resistors provides the TIA 300 feedback resistance. The current through resistor $R_{FX}$ is sensed by current sensor 301. The amplifier 303 may comprise a variable gain amplifier where a control signal configures the gain.

FIG. 3 illustrates a modified version of the original topology of FIG. 2 with the addition of a resistor $R_{FX}$ generating a sense current $I_S$ defined by $V_{out}/R_{FX}$ and a current sensor 301 that detects this current. The current sensor 301 redirects a fraction of this current, given by $\alpha V_{out}/R_{FX}$, to the amplifier 303 input. The gain of the TIA 300 is therefore given by: $G=R_F/(1+\alpha R_F/R_{FX})$, which enables variable gain through control of $\alpha$, the proportion of sensed current $I_S$ ($I_C$) injected to the TIA 300 input. In addition, the gain of the amplifier 303 may be configured to equal $A/(1+\alpha)$, where A is the maximum gain of the gain stage, which configures the loop gain of the circuit to be a constant, thereby preserving the frequency characteristics of the topology across gain variation.

In operation, an input current $I_{IN}$ is coupled to the TIA 300, which generates an output voltage $V_{out}$. The gain of the TIA is configured by the feedback resistor $R_F$ in parallel with the sense resistor $R_{FX}$, and the current $I_C$ configured by the current sensor 301. Furthermore, the gain of the amplifier 303 may be configured to configure the loop gain at a constant and keep the frequency response constant. This control of gain using the resistor $R_{FX}$ and current sensor feedback path in parallel with a fixed resistance feedback path enables precise control of the gain with robust frequency response.

Figure 4:
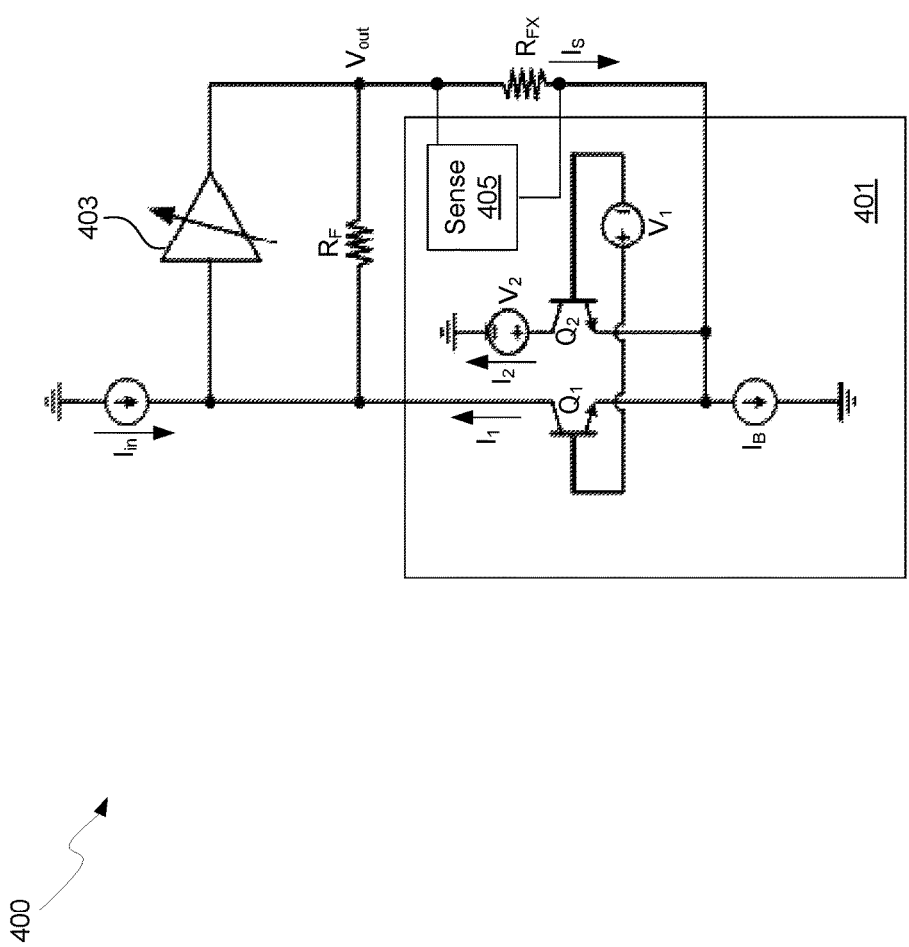
FIG. 4 illustrates a current sensor implementation in a transimpedance amplifier with continuous gain control, which may be used in accordance with various embodiments of the disclosure.

FIG. 4 illustrates a current sensor implementation in a transimpedance amplifier with continuous gain control, which may be used in accordance with various embodiments of the disclosure. Referring to FIG. 4, there is shown TIA 400 comprising an amplifier 403, feedback resistance $R_F$, current sense resistor $R_{FX}$, a feedback current control 401, an input current $I_{in}$, and an output voltage $V_{out}$.

As in FIG. 3, the resistors $R_F$ and $R_{FX}$ may comprise fixed resistors, for example, where the parallel combination of the resistors and current injected by the feedback current control 401 configure the gain of the TIA 400. The current through resistor $R_{FX}$ is sensed by feedback current control 401. The amplifier 403 may comprise a variable gain amplifier where a control signal configures the gain.

The feedback current control 401 may comprise emitter-coupled transistor pair $Q_1$ and $Q_2$, current source $I_B$, current sensor 405, and voltage supplies $V_1$ and $V_2$. While the transistor pair $Q_1$ and $Q_2$ is shown as BJTs in FIG. 4, the disclosure is not so limited as they may comprise CMOS or other transistor structures. The bias current $I_B$ provides a DC bias current for the transistor pair $Q_1/Q_2$. The current in current sense resistor $R_{FX}$ may be sensed by the current sensor 405 by monitoring the voltage across the resistor, for example, although this is optional, as the gain can simply be measured by the output voltage and adjusted accordingly.

In this architecture, the transistor pair $Q_1$ and $Q_2$ may be utilized as a current configuration circuit in that the current $I_1$ may be configured at a desired level and provided to the input to the TIA 400, which is also the input to the gain stage 403. The fraction $\alpha=I_1/I_S$, representing the fraction of the sensed current $I_S$ that is coupled as $I_1$ into the TIA 400 input, may be achieved by appropriate value of control voltages $V_1$ and $V_2$, enabling continuous or discrete gain control. The current $I_2$ in transistor $Q_2$ is thus given by $(1-\alpha)I_1$. As the voltage $V_1$ is applied to the control terminals of the emitter-coupled transistors $Q_1$ and $Q_2$, base (or gate terminals in the case of CMOS) it may be considered a differential voltage. Increasing the differential voltage $V_1$ results in higher current through $Q_1$, and thus higher current $I_1$. In addition, $V_2$ may be configured to increase current in $Q_2$ when on. The control of the voltages $V_1$ and $V_2$ based on the current sensed in current sense resistor $R_{FX}$ may be performed by a processor, for example, such as the processor 110 described with respect to FIG. 1, or other processing circuitry in the electronic device 100.

In operation, an input current $I_{IN}$ is coupled to the TIA 400, which generates an output voltage $V_{out}$. The gain of the TIA is configured by the feedback resistor $R_F$ in parallel with the sense resistor $R_{FX}$, and the current $I_1$ configured by the feedback current control 401. The current $I_1$ may be configured by adjusting $V_1$ and/or $V_2$ in the feedback current control 401.

Furthermore, the gain of the amplifier 403 may be configured to configure the loop gain at a constant and keep the frequency response constant. This control of gain using the resistor $R_{FX}$ and current sensor feedback path in parallel with a fixed resistance feedback path enables precise control of the gain with robust frequency response.

Figure 5:
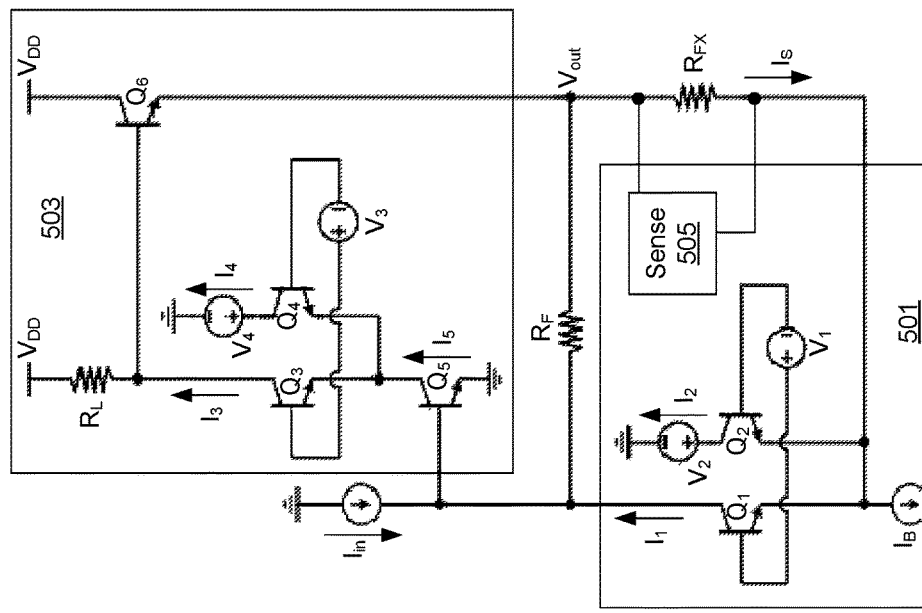
FIG. 5 illustrates a current sensor and variable gain stage implementation in a transimpedance amplifier with continuous gain control, which may be used in accordance with various embodiments of the disclosure.

FIG. 5 illustrates a current sensor and variable gain stage implementation in a transimpedance amplifier with continuous gain control, which may be used in accordance with various embodiments of the disclosure. Referring to FIG. 5, there is shown TIA 500 comprising an amplifier 503, feedback resistance $R_F$, current sense resistor $R_{FX}$, a feedback current control 501, an input current $I_{in}$, and an output voltage $V_{out}$.

As in FIGS. 3 and 4, the resistors $R_F$ and $R_{FX}$ may comprise fixed resistors, for example, where the parallel combination of the resistors and current injected by the feedback current control 501 configure the gain of the TIA 500. The current through resistor $R_{FX}$ may be sensed by feedback current control 501, and specifically by current sensor 505. The amplifier 503 may comprise a variable gain amplifier where a control signal configures the gain. The amplifier 503 may comprise transistors Q3-Q6, load resistor $R_L$, and supply voltages $V_3$, $V_4$, and $V_{DD}$.

The feedback current control 501 may comprise emitter-coupled transistor pair $Q_1$ and $Q_2$, current source $I_B$, current sensor 505, and voltage supplies $V_1$ and $V_2$. While the transistor pair $Q_1$ and $Q_2$ is shown as BJTs in FIG. 5, the disclosure is not so limited as they may comprise CMOS or other transistor structures. The bias current $I_B$ provides DC bias current for the transistor pair $Q_1/Q_2$. The current in current sense resistor $R_{FX}$ may be sensed by the current sensor 505 by monitoring the voltage across the resistor, for example, although this is optional, as the gain can simply be measured by the output voltage and the control voltages adjusted accordingly.

In this architecture, the transistor pair $Q_1$ and $Q_2$ may be utilized as a current configuration circuit in that the current $I_1$ may be configured at a desired level and provided to the input to the TIA 400, which is also the input to the gain stage 403. The fraction $\alpha=I_1/I_S$, representing the fraction of the sensed current $I_S$ that is coupled as $I_1$ into the TIA 400 input, may be achieved by appropriate value of control voltages $V_1$ and $V_2$, enabling continuous or discrete gain control. As the voltage $V_1$ is applied to the control terminals of the emitter-coupled transistors $Q_1$ and $Q_2$, base (or gate terminals in the case of CMOS) it may be considered a differential voltage. Accordingly, increasing differential voltage $V_1$ results in higher current through $Q_1$, and thus higher current $I_1$. In addition, $V_2$ may be configured to increase current in $Q_2$ when on. The control of the voltages $V_1$ and $V_2$ based on the current sensed in current sense resistor $R_{FX}$ may be performed by a processor, for example, such as the processor 110 described with respect to FIG. 1, or other processing circuitry in the electronic device 100.

A second embodiment of the topology is shown in FIG. 5 where a specific implementation for the amplifier 503 along with current sensor configuration of FIG. 4 is shown. The TIA structures shown in FIGS. 3-5 enable a) continuously variable gain, b) consistent frequency response under various gain settings, c) maximal signal-to-noise ratio at maximal gain since the gain control circuitry does not add noise, and d) good linearity with continuously variable gain in a feedback TIA.

In operation, an input current $I_{IN}$ is coupled to the TIA 500, which generates an output voltage $V_{out}$. The gain of the TIA is configured by the feedback resistor $R_F$ in parallel with the sense resistor $R_{FX}$, and the current $I_1$ configured by the feedback current control 501. The current $I_1$ may be configured by adjusting $V_1$ and/or $V_2$ in the feedback current control 501.

The input current $I_{IN}$ is amplified by $Q_5$, with gain configured by the load resistance $R_L$ and transistor pair $Q_3$ and $Q_4$, with the output collector voltage of $Q_3$ providing an input voltage to common collector $Q_6$, with the output voltage $V_{out}$ at the emitter of $Q_6$. The current $I_5$ may comprise the sum of the currents $I_3$ and $I_4$, which are configured with control voltage $V_3$. Accordingly, the current I3 is equal a factor $\beta$ times the current $I_5$, and $I_4=(1-\beta)I_4$. The gain of the amplifier in this configuration is $\beta G_m R_L$ with $G_m$ being the transistor $Q_5$ transconductance.

The gain of the amplifier 503 may be configured to retain the loop gain at a constant value if desired as well as keep the frequency response constant. The gain of amplifier 503 may be configured by adjusting the supply voltages $V_3$ and/or $V_4$, i.e., adjusting $\beta$, such that an increase in voltage $V_3$ causes a higher proportion of current to flow through $Q_3$, and thus higher output voltage at $V_{out}$. The value of $\beta$ may be configured to $1/(1+\alpha R_F/R_{FX})$. This control of gain using the resistor $R_{FX}$ and current sensor feedback path in parallel with a fixed resistance feedback path enables precise control of the gain with robust frequency response.

Certain aspects of the disclosure may be found in a method and system for continuous gain control in a feedback transimpedance amplifier (TIA). Exemplary aspects of the disclosure may comprise, in a TIA comprising a gain stage, a feedback resistance for said gain stage, a current sense resistor, and a feedback current control circuit: receiving an input current at an input of said gain stage: sensing a current through said current sense resistor, and generating an output voltage proportional to said input current and a gain of said TIA. The gain is configured by providing a proportion ($\alpha$) of said sensed current from the feedback current control circuit to the input of said gain stage. The proportion $\alpha$ of the sensed current from the feedback current control circuit to the input of the gain stage may be configured by applying a differential voltage to control terminals of a transistor pair in the feedback current control circuit. The proportion $\alpha$ of the sensed current from the feedback current control circuit to the input of the gain stage may be configured by configuring a voltage coupled to one of a pair of transistors in the feedback current control circuit. A gain of the gain stage may be configured by applying a differential voltage to control terminals of a transistor pair in the gain stage. A gain of the gain stage may be configured to be equal to $A/(1+\alpha)$, where A is the maximum gain of the gain stage. The input current may be received from a photodetector. The TIA may comprise bipolar or CMOS transistors. The gain stage and the feedback current control circuit may each comprise an emitter-coupled transistor pair. The feedback resistor and the current sense resistor may comprise fixed resistors.

One embodiment of the present disclosure may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for continuous gain control in a feedback transimpedance amplifier.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for optical communication, the method comprising:
   in a transimpedance amplifier (TIA) comprising a gain stage, a feedback resistance for said gain stage, a current sense resistor, and a feedback current control circuit:
      receiving an input current at an input of said gain stage;
      directing a current through said current sense resistor to said feedback current control circuit; and
      generating an output voltage proportional to said input current and a gain of said TIA, wherein said gain is configured by providing, by said feedback current control circuit, a current to said input of said gain stage that is a proportion ($\alpha$) of said current directed through said current sense resistor.

2. The method according to claim 1, comprising configuring said proportion $\alpha$ of said current provided by said feedback current control circuit to said input of said gain stage by applying a differential voltage to control terminals of a transistor pair in said feedback current control circuit.

3. The method according to claim 1, comprising configuring said proportion $\alpha$ of said current provided by said feedback current control circuit to said input of said gain stage by configuring a voltage coupled to one of a pair of transistors in said feedback current control circuit.

4. The method according to claim 1, comprising configuring a gain of said gain stage by applying a differential voltage to control terminals of a transistor pair in said gain stage.

5. The method according to claim 1, comprising configuring a gain of said gain stage to equal $A/(1+\alpha)$, where A is the maximum gain of said gain stage.

6. The method according to claim 1, comprising receiving said input current from a photodetector.

7. The method according to claim 1, wherein said TIA comprises bipolar transistors.

8. The method according to claim 7, wherein said gain stage and said feedback current control circuit each comprise an emitter-coupled transistor pair.

9. The method according to claim 1, wherein said TIA comprises metal-oxide semiconductor (CMOS) transistors.

10. The method according to claim 1, wherein said feedback resistor and said current sense resistor comprise fixed resistors.

11. A system for optical communication, the system comprising:
   a transimpedance amplifier (TIA) comprising a gain stage, a feedback resistance for said gain stage, a current sense resistor, and a feedback current control circuit, said TIA being operable to:
      receive an input current at an input of said gain stage;
      direct a current through said current sense resistor to said feedback current control circuit; and
      generate an output voltage proportional to said input current and a gain of said TIA, wherein said gain is configured by providing, by said feedback current control circuit, a current to said input of said gain stage that is a proportion ($\alpha$) of said current directed through said feedback current sense resistor.

12. The system according to claim 11, wherein said TIA is operable to configure said proportion $\alpha$ of said current provided by said feedback current control circuit to said input of said gain stage by applying a differential voltage to control terminals of a transistor pair in said feedback current control circuit.

13. The system according to claim 12, wherein said TIA is operable to configure said proportion $\alpha$ of said current provided by said feedback current control circuit to said input of said gain stage by configuring a voltage coupled to one of a pair of transistors in said feedback current control circuit.

14. The system according to claim 11, wherein said TIA is operable to configure a gain of said gain stage by applying a differential voltage to control terminals of a transistor pair in said gain stage.

15. The system according to claim 11, wherein said TIA is operable to configure a gain of said gain stage to equal $A/(1+\alpha)$, where A is the maximum gain of said gain stage.

16. The system according to claim 11, wherein said TIA is operable to receive said input current from a photodetector.

17. The system according to claim 11, wherein said TIA comprises bipolar transistors.

18. The system according to claim 17, wherein said gain stage and said feedback current control circuit each comprise an emitter-coupled transistor pair.

19. The system according to claim 11, wherein said TIA comprises metal-oxide semiconductor (CMOS) transistors.

20. A system for optical communication, the system comprising:

a transimpedance amplifier (TIA) comprising a gain stage, a feedback resistance for said gain stage, a current sense resistor, and a feedback current control circuit, said TIA being operable to:

receive an input current at an input of said gain stage;

direct a current through said current sense resistor to said feedback current control circuit; and generate an output voltage proportional to said input current and a gain of said TIA, wherein said gain is configured by providing, by said feedback current control circuit, a proportion ($\alpha$) of said current directed through said current sense resistor to said input of said gain stage, and wherein said gain is equal to $R_F/(1=\alpha*R_F/R_{FX})$ where $R_F$ is a resistance of said feedback resistance and $R_{FX}$ is a resistance of said current sense resistor.

* * * * *